US012041496B2

(12) United States Patent
Lee et al.

(10) Patent No.: US 12,041,496 B2
(45) Date of Patent: Jul. 16, 2024

(54) TERMINAL FOR PERFORMING MEASUREMENT OPERATION FOR HANDOVER, COMMUNICATION SYSTEM INCLUDING THE SAME, AND OPERATION METHODS THEREOF

(71) Applicant: Samsung Electronics Co., Ltd., Suwon-si (KR)

(72) Inventors: Kyunghwan Lee, Seoul (KR); Minwhan Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 111 days.

(21) Appl. No.: 17/559,276

(22) Filed: Dec. 22, 2021

(65) Prior Publication Data

US 2022/0232439 A1   Jul. 21, 2022

(30) Foreign Application Priority Data

Jan. 15, 2021   (KR) .................. 10-2021-0005802

(51) Int. Cl.
*H04W 36/00* (2009.01)
(52) U.S. Cl.
CPC . *H04W 36/00837* (2018.08); *H04W 36/0058* (2018.08); *H04W 36/0077* (2013.01); *H04W 36/008375* (2023.05)
(58) Field of Classification Search
CPC . H04W 24/10; H04W 72/20; H04W 36/0058; H04W 36/00837; H04W 36/0077; H04W 36/008375; H04W 36/00835; H04W 36/0085; H04W 36/0011; H04W 36/30
See application file for complete search history.

(56) References Cited

U.S. PATENT DOCUMENTS

| 6,813,508 | B1 * | 11/2004 | Shioda | .................. | H04W 36/32 370/332 |
| 7,725,106 | B2 | 5/2010 | Tebbit et al. | | |
| 8,855,644 | B2 | 10/2014 | Maida et al. | | |

(Continued)

FOREIGN PATENT DOCUMENTS

| EP | 2836024 A1 | 2/2015 |
| KR | 10-2010-0005311 A | 1/2010 |

(Continued)

OTHER PUBLICATIONS

Partial European Search Report dated Jun. 21, 2022 issued in corresponding European patent application No. 22150735.3.
3GPP TS 38.133 V16.0.0, Release 16 dated Jun. 2019.

*Primary Examiner* — Kan Yuen
(74) *Attorney, Agent, or Firm* — Harness, Dickey & Pierce, P.L.C.

(57) ABSTRACT

A method of operating a terminal includes receiving, from a source cell, a radio resource control (RRC) reconfiguration message including a list of a plurality of first objects in a measurement order, reordering the list of the plurality of first objects based on handover information to obtain a reordered list, the handover information corresponding to a connection history of the terminal, sequentially measuring the plurality of first objects based on the reordered list to obtain a measurement result; and transmitting a measurement report to the source cell based on the measurement result.

18 Claims, 15 Drawing Sheets

(56) References Cited

U.S. PATENT DOCUMENTS

| | | | |
|---|---|---|---|
| 9,008,046 B2 | 4/2015 | Jung et al. | |
| 10,390,385 B2 | 8/2019 | Lee et al. | |
| 10,555,134 B2 | 2/2020 | Shaw et al. | |
| 2004/0151148 A1* | 8/2004 | Yahagi | H04W 88/18 370/338 |
| 2008/0020767 A1* | 1/2008 | Takai | H04W 36/30 455/436 |
| 2009/0075656 A1 | 3/2009 | Tolli et al. | |
| 2009/0088152 A1* | 4/2009 | Orlassino | H04W 48/08 455/432.1 |
| 2009/0238162 A1* | 9/2009 | Yoneyama | H04W 48/00 370/338 |
| 2015/0036663 A1 | 2/2015 | Kilpatrick, II et al. | |
| 2016/0270131 A1* | 9/2016 | Hasegawa | H04W 28/0215 |
| 2016/0353340 A1* | 12/2016 | Yang | H04W 36/0058 |
| 2017/0142618 A1* | 5/2017 | Hahn | H04W 36/18 |
| 2018/0235017 A1* | 8/2018 | Sakamoto | G06F 3/0383 |
| 2020/0162976 A1* | 5/2020 | Yang | H04W 36/0011 |
| 2020/0305052 A1* | 9/2020 | Yoshino | H04W 4/029 |
| 2021/0204158 A1* | 7/2021 | Kimba Dit Adamou | H04L 1/0026 |
| 2021/0219220 A1* | 7/2021 | Hall | H04W 36/165 |

FOREIGN PATENT DOCUMENTS

| | | | | |
|---|---|---|---|---|
| KR | 101517725 B1 | 5/2015 | | |
| WO | WO-2007117025 A1 * | 10/2007 | | H04W 36/30 |

* cited by examiner

| MRU OBJECT | PRIORITY |
|---|---|
| Object #2 | 2 |
| Object #4 | 3 |
| Object #5 | 1 |

| | MRU OBJECT | PRIORITY |
|---|---|---|
| Coverage #1 | Object #2 | 2 |
| | Object #4 | 3 |
| | Object #5 | 1 |
| Coverage #2 | Object #3 | 1 |
| | Object #6 | 2 |
| | Object #2 | 3 |

TERMINAL FOR PERFORMING MEASUREMENT OPERATION FOR HANDOVER, COMMUNICATION SYSTEM INCLUDING THE SAME, AND OPERATION METHODS THEREOF

CROSS-REFERENCE TO RELATED APPLICATION

This application is based on and claims priority under 35 U.S.C. § 119 to Korean Patent Application No. 10-2021-0005802, filed on Jan. 15, 2021, in the Korean Intellectual Property Office, the disclosure of which is incorporated by reference herein in its entirety.

BACKGROUND

The inventive concepts relate to a terminal for performing handover, a communication system including the same, and operation methods thereof.

The communication system may support handover between cells without disconnecting data flow in a connected state to guarantee or provide mobility of the terminal. The terminal may periodically measure an electric field strength with a currently connected source cell (or serving cell) and report the measured electric field strength to the source cell during a service.

For handover, the terminal may perform a measurement operation on objects provided from the source cell, in a measurement order defined in a network. The terminal may transmit a measurement report to the source cell based on a measurement result of a certain object satisfying a certain condition, and the source cell may attempt handover with a candidate cell corresponding to the certain object. However, as a result of measuring the objects in the measurement order defined in the network, the terminal may transmit, to the source cell, a measurement report based on a measurement result of an object, which satisfies the certain condition, but of which a bad electric field state is predicted, and thereafter, the source cell may fail in handover with a corresponding candidate cell. Accordingly, resources and time consumed for handover may be inefficiently too large to limit the performance of a communication system, and thus, research to address this challenge has been briskly conducted.

SUMMARY

The inventive concepts provide a terminal for increasing a handover success probability and improving communication performance by reflecting a connection history of the terminal onto measurement for handover, a communication system including the same, and operation methods thereof.

According to an example embodiment of the inventive concepts, there is provided a method of operating a terminal, the method including: receiving, from a source cell, a radio resource control (RRC) reconfiguration message including a list of a plurality of first objects in a measurement order, reordering the list of the plurality of first objects based on handover information to obtain a reordered list, the handover information corresponding to a connection history of the terminal, sequentially measuring the plurality of first objects based on the reordered list to obtain a measurement result; and transmitting a measurement report to the source cell based on the measurement result.

According to an example embodiment of the inventive concepts, there is provided a terminal including: a memory storing handover information indicating a connection history, and processing circuitry configured to reorder a list of a plurality of first objects based on the connection history to obtain a reordered list in response to a radio resource control (RRC) reconfiguration message from a source cell, the RRC reconfiguration message including the list of the plurality of first objects in a measurement order, measure a plurality of electric field strengths corresponding to the plurality of first objects based on the reordered list to obtain a measurement result, and transmit a measurement report to the source cell based on the measurement result.

According to an example embodiment of the inventive concepts, there is provided a communication system including a source cell configured to transmit, to a first terminal, a radio resource control (RRC) reconfiguration message including a list of a plurality of first objects in a measurement order; and the first terminal configured to reorder the list of the plurality of first objects based on first handover information to obtain a first reordered list, the first handover information indicating a connection history of the first terminal, and measure a plurality of electric field strengths of a plurality of second objects among the plurality of first objects.

BRIEF DESCRIPTION OF THE DRAWINGS

An example embodiment of the inventive concepts will be more clearly understood from the following detailed description taken in conjunction with the accompanying drawings in which:

FIGS. 6A and 6B are first and second tables for describing handover information, respectively, according to an example embodiment of the present disclosure;

DETAILED DESCRIPTION

Hereinafter, an example embodiment of the present disclosure will be described in detail with reference to the accompanying drawings.

Figure 1:
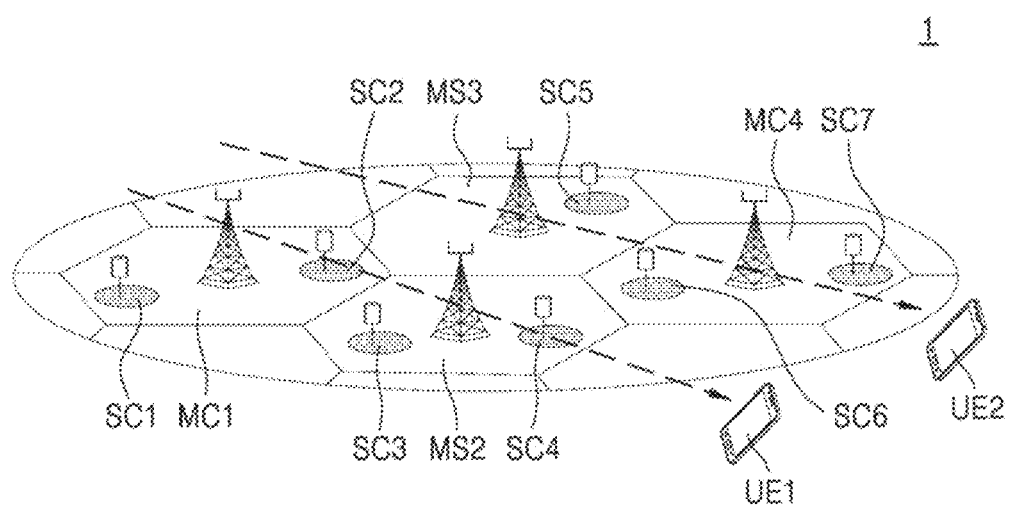
FIG. 1 illustrates a communication system according to an example embodiment of the present disclosure.

FIG. 1 illustrates a communication system 1 according to an example embodiment of the present disclosure. An example embodiment of the present disclosure is applicable to both a homogeneous network including the same types of cells and a heterogeneous network including different types of cells. The communication system 1 may be, as a non-limiting example, a fifth generation (5G) system, a long term evolution (LTE) system, a code division multiple access (CDMA) system, a global system for mobile communications (GSM) system, a wireless local area network (WLAN) system, and/or another wireless communication system. Hereinafter, the communication system 1 will be described based on the premise that the communication system 1 is a 5G system, an LTE system, or a system capable of supporting 5G- and LTE-based communication, but it would be understood that an example embodiment of the present disclosure is not limited thereto.

Referring to FIG. 1, the communication system 1 may include a plurality of macro cells MC1 to MC4, a plurality of small cells SC1 to SC7, and/or first and second terminals UE1 and UE2. The first and second terminals UE1 and UE2 are wireless communication devices, may be mobile, and may transmit and receive data and/or control information by communicating with the plurality of macro cells MC1 to MC4 and the plurality of small cells SC1 to SC7. Each of the first and second terminals UE1 and UE2 may be referred to as, for example, a user equipment (UE), a mobile station (MS), a mobile terminal (MT), a user terminal, a subscriber station (SS), a wireless device, a handheld device, and/or the like.

Each of the plurality of macro cells MC1 to MC4 and the plurality of small cells SC1 to SC7 may be generally referred to as a fixed station configured to communicate with the first and second terminals UE1 and UE2, and/or another cell, and may exchange data and control information by communicating with the first and second terminals UE1 and UE2 and/or another cell. The plurality of macro cells MC1 to MC4 may correspond to a larger coverage area than the plurality of small cells SC1 to SC7. A coverage area indicates a range in which a certain cell is capable of providing a network to a user (or a terminal).

Each of the plurality of macro cells MC1 to MC4 and the plurality of small cells SC1 to SC7 may be referred to as, for example, a base station, a Node B, an evolved Node B (eNB), a sector, a site, a base transceiver system (BTS), an access point (AP), a relay node, a remote radio head (RRH), a radio unit (RU), and/or the like. Although FIG. 1 shows that the communication system 1 includes only the plurality of macro cells MC1 to MC4 and the plurality of small cells SC1 to SC7 corresponding to different coverage areas, this is merely an example, and thus, an example embodiment is not limited thereto, and the communication system 1 may further include mega cells, micro cells, pico cells, femto cells, and/or the like, respectively corresponding to various sizes of coverage areas.

Due to the mobility of the first and second terminals UE1 and UE2, handover may occur from a macro cell to a macro cell, from a macro cell to a small cell, from a small cell to a macro cell, or from a small cell to a small cell. Hereinafter, for convenience of description, an operation of the first terminal UE1 will be mainly described, and it is clear that an example embodiment applied to the first terminal UE1 may also be applied to the second terminal UE2.

The first terminal UE1 may receive a radio resource control (RRC) reconfiguration message including a measurement configuration from a first source cell (or a first serving cell) currently RRC-connected to provide a network service. The measurement configuration may include a list of objects listed in a measurement order. Each of candidate cells to be handed over from the first source cell may include at least one object. Hereinafter, measuring an object may be defined as measuring an electric field strength corresponding to the object by receiving a certain reference signal through a frequency band making a pair with the object. A detailed description of an object will be made below with reference to FIGS. 3 and 5.

In an example embodiment, the first terminal UE1 may reorder the list of the objects based on handover information indicating a connection history of the first terminal UE1. Particularly, the first terminal UE1 may change a measurement order in the existing list of the objects based on a history about cells to which the first terminal UE1 was connected in the past. That is, the first terminal UE1 may customize a fixed measurement order in the list of the objects, which has been provided from a network of the first source cell.

In an example embodiment, the first terminal UE1 may sequentially measure the objects with reference to the reordered list. Thereafter, the first terminal UE1 may transmit a measurement report to the first source cell based on the measurement result. Particularly, the first terminal UE1 may transmit a measurement report to the first source cell based on a corresponding measurement result when a certain condition is satisfied in a measurement result generated by sequentially measuring the objects or when a certain event occurs.

For example, the first terminal UE1 may report a measurement result of a certain object to the first source cell when a measurement result of the certain object is greater than a threshold in a measurement result of the objects and when a time to trigger (TTT) expires by counting, as the TTT, a time for which the measurement result is maintained. In this case, in an example embodiment, the first terminal UE1 may transmit a measurement report to the first source cell based on a measurement result of an object having a relatively high electric field strength by controlling resetting of a TTT timer based on a measurement result of the objects.

The first terminal UE1 according to an example embodiment of the present disclosure may reorder the measurement order in the list of the objects, which has been provided from the network, to a measurement order suitable for the first terminal UE1 and transmit a measurement report to the first source cell based on the measurement result of the object having the relatively high electric field strength, thereby increasing a handover success probability, and may ensure or provide a good electric field state between a handed-over target cell and the first terminal UE1, thereby improving communication performance.

In an example embodiment, the second terminal UE2 may receive an RRC reconfiguration message including a measurement configuration from a second source cell (or a second serving cell). As described above, the measurement configuration may include a list of objects listed in a measurement order. When the network of the first source cell to which the first terminal UE1 is connected is the same as or similar to a network of the second source cell, the first and second terminals UE1 and UE2 may receive the same list of objects or similar lists of objects.

In an example embodiment, the second terminal UE2 may reorder a list of objects based on handover information indicating a connection history of the second terminal UE2.

For example, when the networks of the first and second source cells to which the first and second terminals UE1 and UE2 are respectively connected are the same as (or similar to) each other, and the respective connection histories of the first and second terminals UE1 and UE2 are different from each other, the second terminal UE may reorder a list of objects unlike (e.g., different from) the first terminal UE1. According to an example embodiment, the list of objects provided with the RRC reconfiguration message (may also be referred to as first objects) may be the same as, similar to, or different from the objects indicated in the connection history of the first terminal UE1 (may also be referred to as second objects) and/or the objects indicated in the connection history of the second terminal UE1 (may also be referred to as third objects). According to an example embodiment the objects indicated in the connection history of the first terminal UE1 (may also be referred to as second objects) may be the same as, similar to, or different from the objects indicated in the connection history of the second terminal UE1 (may also be referred to as third objects).

When a measurement operation for handover is performed, the first and second terminals UE1 and UE2 may reorder a list in a measurement order suitable for each of the first and second terminals UE1 and UE2 without measuring objects in the same measurement order (or similar measurement orders). As a result, the first and second terminals UE1 and UE2 connected to the same network, or similar networks, may have different measurement orders for objects in a measurement operation for handover.

Figure 2:
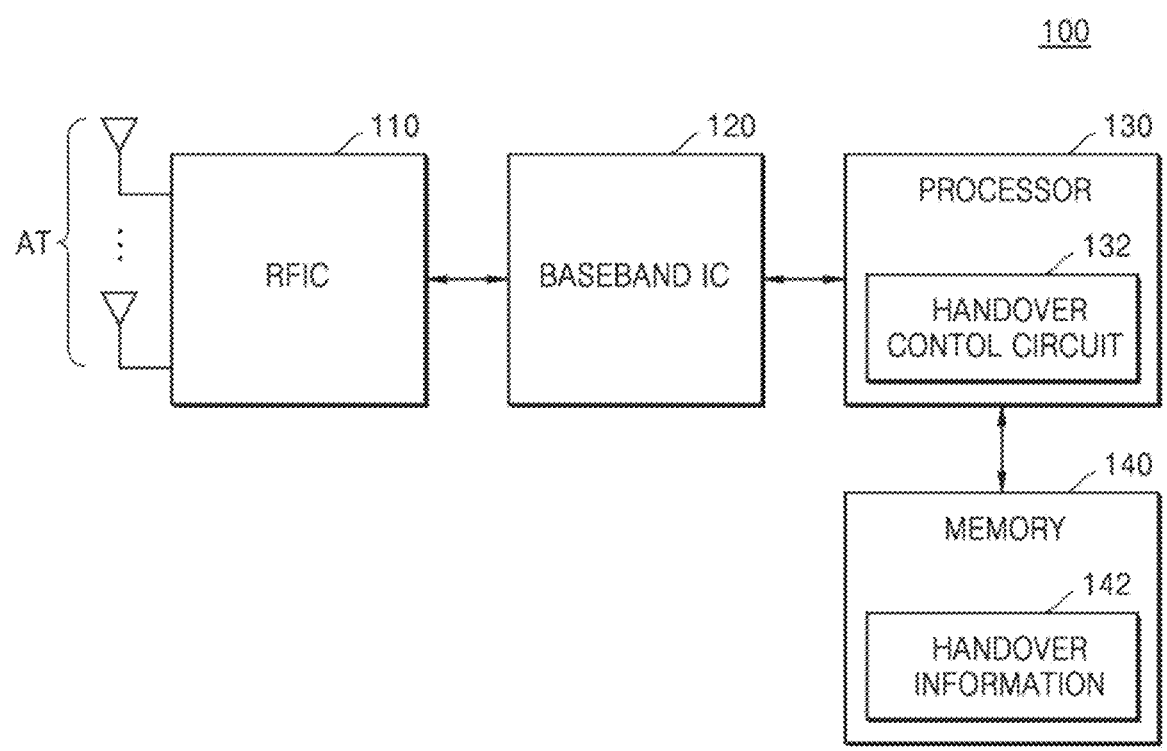
FIG. 2 is a block diagram of a terminal according to an example embodiment of the present disclosure.

FIG. 2 is a block diagram of a terminal 100 according to an example embodiment of the present disclosure. Hereinafter, an example embodiment of the terminal 100 to be described may be applied to each of the first and second terminals UE1 and UE2 of FIG. 1.

Referring to FIG. 2, the terminal 100 may include a plurality of antennas AT, a radio frequency integrated circuit (RFIC) 110, a baseband IC 120, a processor 130, and/or a memory 140. An implementation example of the terminal 100 shown in FIG. 2 is merely illustrative, and thus, an example embodiment is not limited thereto, and the terminal 100 may include more or less components.

The RFIC 110 may perform functions, such as band conversion and amplification of a signal, for transmitting and receiving the signal through a radio channel by using the plurality of antennas AT. Particularly, the RFIC 110 may up-convert a baseband signal provided from the baseband IC 120 into an RF band signal and then transmit the RF band signal through the plurality of antennas AT, and down-convert an RF band signal received through the plurality of antennas AT into a baseband signal. For example, the RFIC 110 may include a transmission filter, a reception filter, an amplifier, a mixer, an oscillator, a digital-to-analog converter (DAC), an analog-to-digital converter (ADC), and/or the like. In addition, the RFIC 110 may further include a plurality of RF chains (not shown) and perform beamforming by using the plurality of antennas AT. The RFIC 110 may adjust, for beamforming, a phase and a magnitude of each of signals received and to be transmitted through the plurality of antennas AT. Furthermore, the RFIC 110 may perform multi input multi output (MIMO) communication and receive several layers in a MIMO operation.

The baseband IC 120 may perform a conversion operation between a baseband signal and a bitstream according to a physical layer standard of a system. For example, the baseband IC 120 may generate complex symbols by encoding and modulating a transmission bitstream in data transmission. In addition, the baseband IC 120 may restore a reception bitstream by demodulating and decoding a baseband signal provided from the RFIC 110 in data reception.

The RFIC 110 and the baseband IC 120 may transmit and receive signals as described above. The RFIC 110 and the baseband IC 120 may be referred to as a transmitter, a receiver, a transceiver, or a communication unit. Furthermore, at least one of the RFIC 110 and/or the baseband IC 120 may include a plurality of communication modules configured to support a plurality of different radio access technologies. In addition, at least one of the RFIC 110 and/or the baseband IC 120 may include different communication modules to process signals of different frequency bands. For example, the different radio access technologies may include a new radio (NR) technology, an LTE technology, and/or the like. In addition, the different frequency bands may include a super high frequency band, a millimeter frequency band, and/or the like. The terminal 100 may communicate with a cell by using the RFIC 110 and the baseband IC 120.

The processor 130 may control a general operation of the terminal 100. In an example embodiment, the processor 130 may include a handover control circuit 132 configured to perform a measurement operation by reordering a list of objects, which has been provided from a source cell, for handover. The handover control circuit 132 may reorder the list to measure objects based on a measurement order suitable for the terminal 100 with reference to handover information 142 including a connection history of the terminal 100. That is, the handover control circuit 132 may reorder a measurement order of the list to first measure objects to be selectively measured when considering the connection history of the terminal 100.

The handover control circuit 132 may perform a measurement operation on objects based on the reordered list and transmit a measurement report to a source cell based on the measurement result by using the RFIC 110 and the baseband IC 120. The handover control circuit 132 may be implemented by a software logic, a hardware logic, or a software/hardware mixed logic. An operation of the handover control circuit 132 may be referred to as an operation of the processor 130.

In an example embodiment, the handover control circuit 132 may periodically or aperiodically collect the connection history of the terminal 100 to generate and update the handover information 142. In an example embodiment, the handover control circuit 132 may include a neural network engine for machine learning of the connection history of the terminal 100, and when an input indicating a past or current network situation of the terminal 100 is received, the handover control circuit 132 may output the handover information 142 corresponding to the input.

The memory 140 may store data such as a basic program, an application program, and/or configuration information for an operation of the terminal 100. In addition, the memory 140 may store, in a code form, a program to be executed when the processor 130 performs a handover-related operation according to an example embodiment of the present disclosure. In an example embodiment, the memory 140 may store the handover information 142 to be referred to reorder a list.

In an example embodiment, the handover information 142 may include information indicating priorities of objects corresponding to cells to which the terminal 100 was connected in the past within a certain period of time from the present. In an example embodiment, the handover information 142 may be generated by determining priorities in an order of cells to which the terminal 100 was recently connected. In an example embodiment, the handover information 142 may be generated by determining priorities in an order of cells having a higher electric field strength measured when the terminal 100 was connected. In addition, in an example embodiment, the handover information 142 may include priorities determined based on information about connection time points of cells to which the terminal 100 was recently connected and information about an electric field strength between the terminal 100 and each of cells when the terminal 100 was connected to the cells. Besides the examples described above, the handover information 142 may further include various pieces of information indicating the connection history of the terminal 100.

Figure 3:
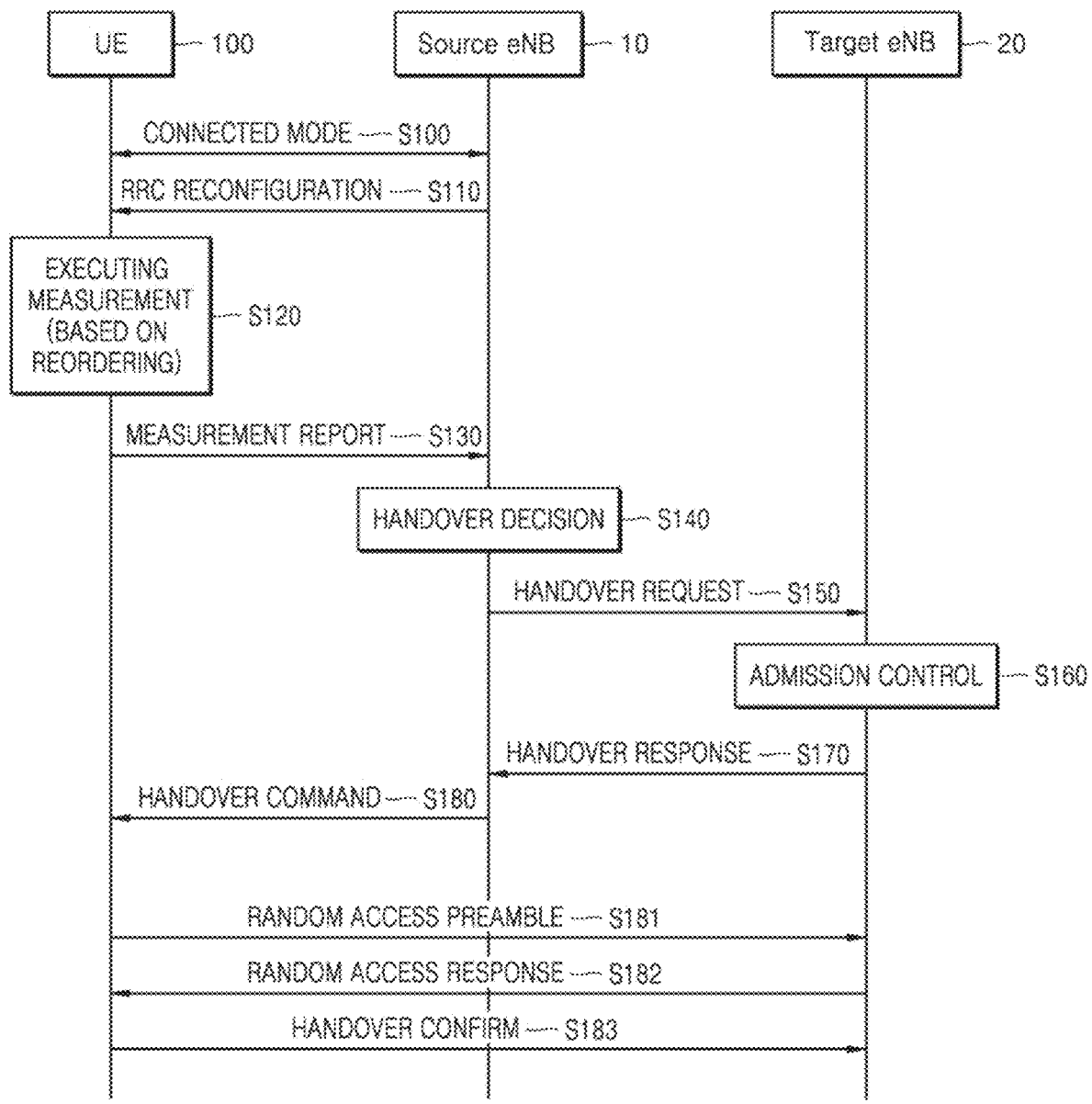
FIG. 3 is a signaling diagram of a handover operation in a communication system, according to an example embodiment of the present disclosure.

FIG. 3 is a signaling diagram of a handover operation in a communication system, according to an example embodiment of the present disclosure. The description below may be based on a specification (e.g., 3rd Generation Partnership Project Technical Specification (3GPP TS) 38.331) defined in a standard document of 3GPP.

Referring to FIG. 3, in operation S100, the terminal 100 may receive a network service from a source cell 10 by operating in a connected mode in an RRC connection state with the source cell 10. In operation S110, the source cell 10 may provide an RRC reconfiguration message to the terminal 100. In an example embodiment, the source cell 10 may provide the RRC reconfiguration message to the terminal 100 by setting 'reportAddNeighMeas' to 'reportConfig' associated with certain a 'measID' in a measurement configuration. The 'measID' may be associated with an object (or a measurement object), and the 'reportConfig' may inform the terminal 100 of which one is to be measured as an electric field strength with an object. In an example embodiment, an electric field strength may be based on at least one of reference signal received power (RSRP), reference signal received quality (RSRQ), signal to interference plus noise Ratio (SINK), received signal code power (RSCP) and/or received energy from pilot signal to noise density (EcN0). For example, when RSRP measurement is set in the 'reportConfig', the terminal 100 may measure RSRP of each of objects.

The RRC reconfiguration message may include a list of objects listed in a certain measurement order. The objects may correspond to candidate cells which may be selected as a target cell 20. Particularly, each of the candidate cells may have at least one frequency band allocated thereto, and one frequency band may make a pair with one object. That is, when a plurality of frequency bands are allocated to a candidate cell, the candidate cell may correspond to a plurality of objects.

In operation S120, the terminal 100 may reorder a list provided from the source cell 10, based on handover information indicating a connection history of the terminal 100. For example, the terminal 100 may change a measurement order of objects in the list to an order of cells to which the terminal 100 was recently connected, and/or change the measurement order of the objects in the list to an order of electric field strengths with the cells to which the terminal 100 was recently connected That is, the terminal 100 may customize the measurement order of the objects to be suitable for the connection history of the terminal 100. The terminal 100 may sequentially measure the objects with reference to the reordered list.

In operation S130, the terminal 100 may transmit a measurement report to the source cell 10 based on a measurement result of a certain object when the measurement result of the certain object satisfies a certain condition during a sequential measurement operation on the objects. In an example embodiment, the terminal 100 may transmit a measurement report to the source cell 10 based on a measurement result of a certain object when the measurement result of the certain object is greater than a threshold and when a TTT expires by counting, as the TTT, a time for which the measurement result is maintained. A particular measurement report condition is described in '3GPP TS 38.331' that is a 3GPP standard document, and thus, a detailed description thereof is omitted herein.

In operation S140, the source cell 10 may determine, as the target cell 20, a candidate cell corresponding to an object included in the measurement report and determine whether to perform handover. In operation S150, the source cell 10 may transmit a handover request to the target cell 20 when handover is determined. In operation S160, the target cell 20 may perform a handover admission control. In operation S170, the target cell 20 may transmit a handover response to the source cell 10. In operation S180, the source cell 10 may transmit a handover command to the terminal 100. In response to the handover command, the terminal 100 may suspend existing communication and release a connection to the source cell 10. In operation S181, the terminal 100 may transmit a random access preamble to the target cell 20 through a random access channel (RACH). In operation S182, the target cell 20 may transmit, to the terminal 100, a random access response including a timing advance (TA) command that is information for synchronization, when the random access preamble is properly received. In operation S183, the terminal 100 may transmit, to the target cell 20, a message indicating that handover is completed, based on uplink resource allocation information included in the random access response, thereby ending a handover procedure. According to an example embodiment, after operation S183 is completed, the terminal 100 may generate a communication signal (e.g., corresponding to application data, a voice call, etc.) and transmit the signal to and/or via the target cell 20 (e.g., to perform a communication via the newly established communication link).

Figure 4:
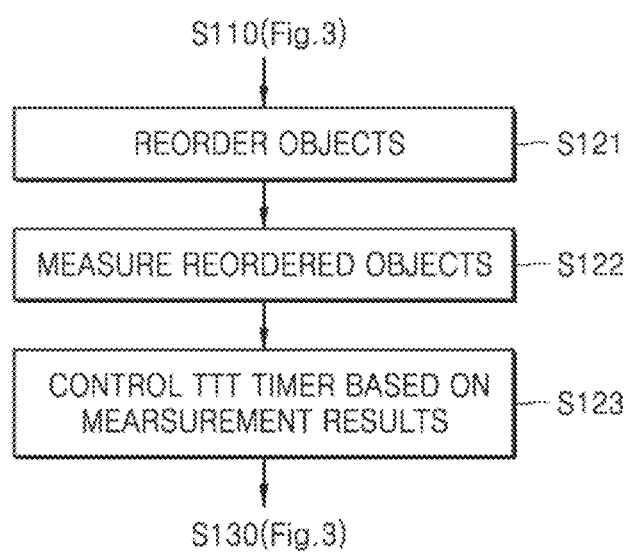
FIG. 4 is a detailed flowchart of operation S120 of FIG. 3.

FIG. 4 is a detailed flowchart of operation S120 of FIG. 3.

Referring to FIG. 4, subsequent to operation S110 of FIG. 3, in operation S121, the terminal 100 may reorder a measurement order of objects in a list included in the RRC reconfiguration message, based on handover information indicating the connection history of the terminal 100. In operation S122, the terminal 100 may sequentially measure the objects reordered in a measurement order suitable for the connection history of the terminal 100. In an example embodiment, the terminal 100 may selectively measure objects according to a measurement order determined by prioritizing objects corresponding to cells to which the terminal 100 was recently connected, objects having a higher electric field strength measured when the terminal 100 was connected, or objects for which both the two elements are considered. In operation S123, the terminal 100 may control a TTT timer for checking measurement report condition achievement, based on a measurement result of the objects. In an example embodiment, the terminal 100 may sequentially compare respective measured electric field strengths of the objects and reset the TTT timer based on the comparison result. A detailed example thereof will be described below with reference to FIG. 8.

Figure 5:
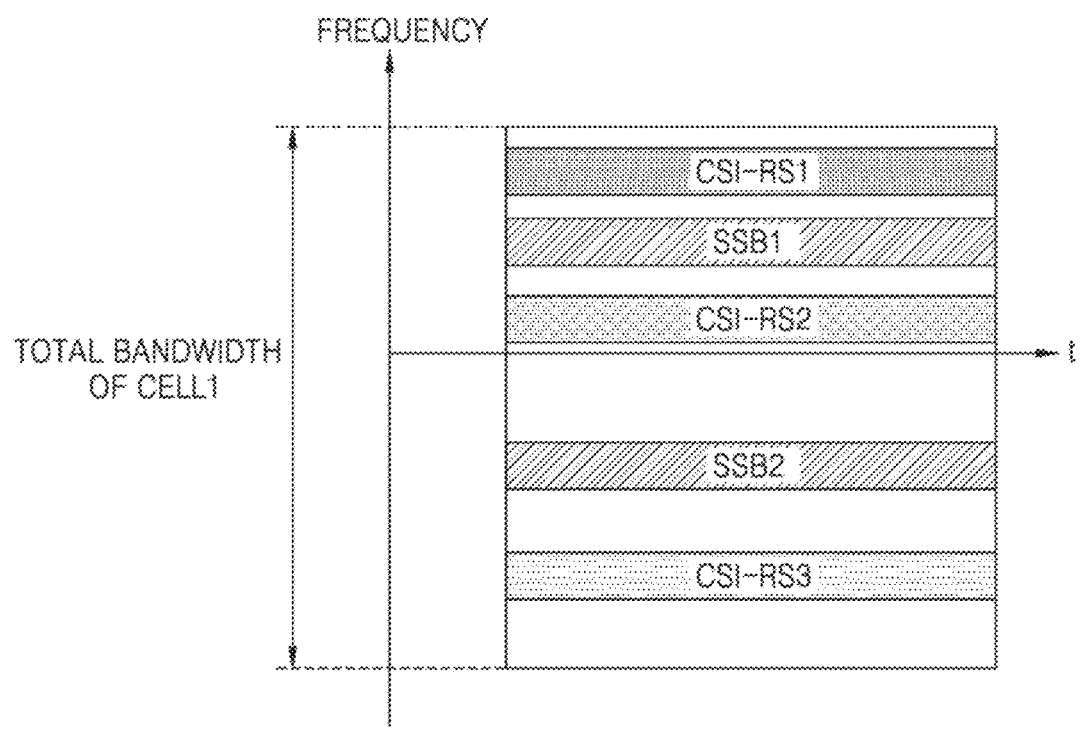
FIG. 5 illustrates an object corresponding to a cell, according to an example embodiment of the present disclosure.

FIG. 5 illustrates an object corresponding to a cell Cell1, according to an example embodiment of the present disclosure.

Referring to FIG. 5, there may be a plurality of measurable frequency bands defined in the cell (or candidate cell) Cell1. Frequency bands indicated by synchronization signal block (SSB)1 and SSB2 in the cell Cell1 may be reference signals for electric field strength measurement, and may indicate frequency bands in which the SSB1 and the SSB2 are respectively transmitted. In addition, channel state information-reference signal (CSI-RS)1, CSI-RS2, and CSI-RS3 may be other reference signals for electric field strength measurement and may indicate frequency bands in which the CSI-RS1, the CSI-RS2, and the CSI-RS3 are respectively transmitted.

As described above, a plurality of frequency bands in which reference signals for electric field strength measurement are transmitted may be allocated to the cell Cell1, and an object for radio resource management (RRM) may be set for one, or each of some, among the plurality of frequency bands. According to an example embodiment, an object as described herein may refer to a cell, a synchronization signal block (e.g., an SSB), a reference signal (e.g., a CSI-RS), and/or a frequency band.

That is, an entire frequency band allocated to the cell Cell1 may include five frequency bands for reference signal transmission, and thus, the maximum (or highest) number of objects corresponding to the cell Cell1 may be defined as 5.

FIGS. 6A and 6B are first and second tables TB1 and TB2 for describing handover information, respectively, according to an example embodiment of the present disclosure.

Referring to FIG. 6A, handover information including the first table TB1 may include information indicating objects corresponding to cells to which a terminal was recently connected. For example, the handover information including the first table TB1 may indicate second, fourth, and fifth objects Object #2, Object #4, and Object #5 corresponding to cells to which the terminal was connected in the past within a certain period of time from the present, and priorities determined in an order of recently connected (e.g. most-recently) cells. Particularly, the fifth object Object #5 corresponding to the most recently connected cell may have the highest priority, the second object Object #2 may have a second highest priority, and the fourth object Object #4 may have the lowest priority. According to an example embodiment, the list of objects provided with the RRC reconfiguration message (may also be referred to as first objects) may be the same as, similar to, or different from the objects indicated in the handover information (may also be referred to as second objects). According to an example embodiment, the priorities of the objects included in the handover information may be determined such that an object associated with a cell to which the terminal 100 has connected to more recently is assigned a higher priority than an object associated with a cell to which the terminal 100 has connected to less recently.

As another example, the handover information including the first table TB1 may indicate the second, fourth, and fifth objects Object #2, Object #4, and Object #5 corresponding to cells to which the terminal was connected in the past within a certain period of time from the present, and priorities determined in an order of cells having a higher electric field strength (e.g., highest electric field strength) measured when the terminal was connected to each cell. Particularly, the fifth object Object #5 corresponding to a cell having the highest electric field strength may have the highest priority, the second object Object #2 may have a second highest priority, and the fourth object Object #4 may have the lowest priority.

The terminal may selectively measure the fifth object Object #5, the second object Object #2, and the fourth object Object #4 in their order by reordering a list of objects having a measurement order, based on the handover information including the first table TB1.

Referring to FIG. 6B, handover information including the second table TB2 may include information indicating objects corresponding to cells to which a terminal was recently connected for each coverage (e.g., network coverage-specific priorities). For example, the handover information including the second table TB2 may indicate the second, fourth, and fifth objects Object #2, Object #4, and Object #5 corresponding to cells to which the terminal was connected in a first coverage Coverage #1 in the past within a certain period of time from the present, and priorities determined in an order of recently connected cells and indicate second, third, and sixth objects Object #2, Object #3, and Object #6 corresponding to cells to which the terminal was connected in a second coverage Coverage #2 and priorities determined in an order of recently connected cells.

As another example, the handover information including the second table TB2 may indicate the second, fourth, and fifth objects Object #2, Object #4, and Object #5 corresponding to cells to which the terminal was connected in the first coverage Coverage #1 in the past within a certain period of time from the present, and priorities determined in an order of cells having a higher electric field strength measured when the terminal was connected to each cell, and indicate the second, third, and sixth objects Object #2, Object #3, and Object #6 corresponding to cells to which the terminal was connected in the second coverage Coverage #2 and priorities determined in an order of cells having a higher electric field strength measured when the terminal was connected to each cell.

In an example embodiment, objects and priorities matched with any one coverage in the handover information including the second table TB2 may be the same as or different from objects and priorities matched with the other coverage.

However, the handover information described with reference to FIGS. 6A and 6B is merely an example, and thus, an example embodiment is not limited thereto, and the handover information may include various pieces of information to perform a measurement operation on which a connection history of a terminal is reflected.

Figure 7:
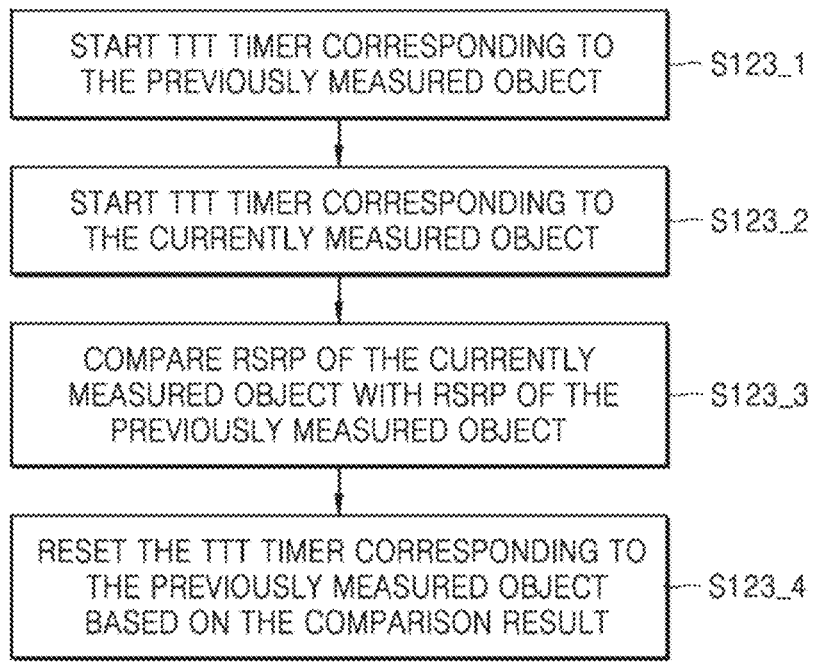
FIG. 7 is a detailed flowchart of operation S123 of FIG. 4.

FIG. 7 is a detailed flowchart of operation S123 of FIG. 4.

Referring to FIG. 7, in operation S123_1, the terminal may start a TTT timer (e.g., a first TTT timer) corresponding to a previously measured object. For example, the terminal may start the TTT timer when first RSRP of the previously measured object is greater than a threshold, and check whether the first RSRP is continuously greater than the threshold until a TTT expires.

In operation S123_2, the terminal may start a TTT timer (e.g., a second TTT timer) corresponding to a currently measured object. For example, the terminal may start the TTT timer when second RSRP of the currently measured object is greater than the threshold, and check whether the second RSRP is continuously greater than the threshold until the TTT expires.

In operation S123_3, the terminal may compare the first RSRP of the previously measured object to the second RSRP of the currently measured object. For example, the terminal may compare the first RSRP to the second RSRP to check (e.g., determine) which measurement value is greater.

In operation S123_4, the terminal may reset the TTT timer (e.g., the first TTT timer) corresponding to the previously measured object based on the comparison result. For example, when the second RSRP is greater than the first RSRP, the terminal may reset the TTT timer corresponding to the previously measured object so that a measurement report is selectively transmitted to the source cell based on a result of the currently measured object having a relatively higher electric field strength. Otherwise, when the second RSRP is less than the first RSRP, the terminal may control the TTT timer corresponding to the previously measured object to be continuously counted so that a measurement report is selectively transmitted to the source cell based on a result of the previously measured object having a relatively higher electric field strength.

As described above, the terminal may control the TTT timer to selectively transmit a measurement report to the source cell based on a measurement result of an object having a better electric field state by comparing a result of a newly measured object to a result of a past measured object.

The measurement, performed by the terminal, of RSRP in FIG. 7 is merely an example, and thus, an example embodiment is not limited thereto, and as described above, the operations described with reference to FIG. 7 may be performed by measuring various elements indicating an electric field strength. To help understanding, FIGS. 8 and 11 will be described based on an example embodiment in which a terminal measures RSRP for handover.

Figure 8:
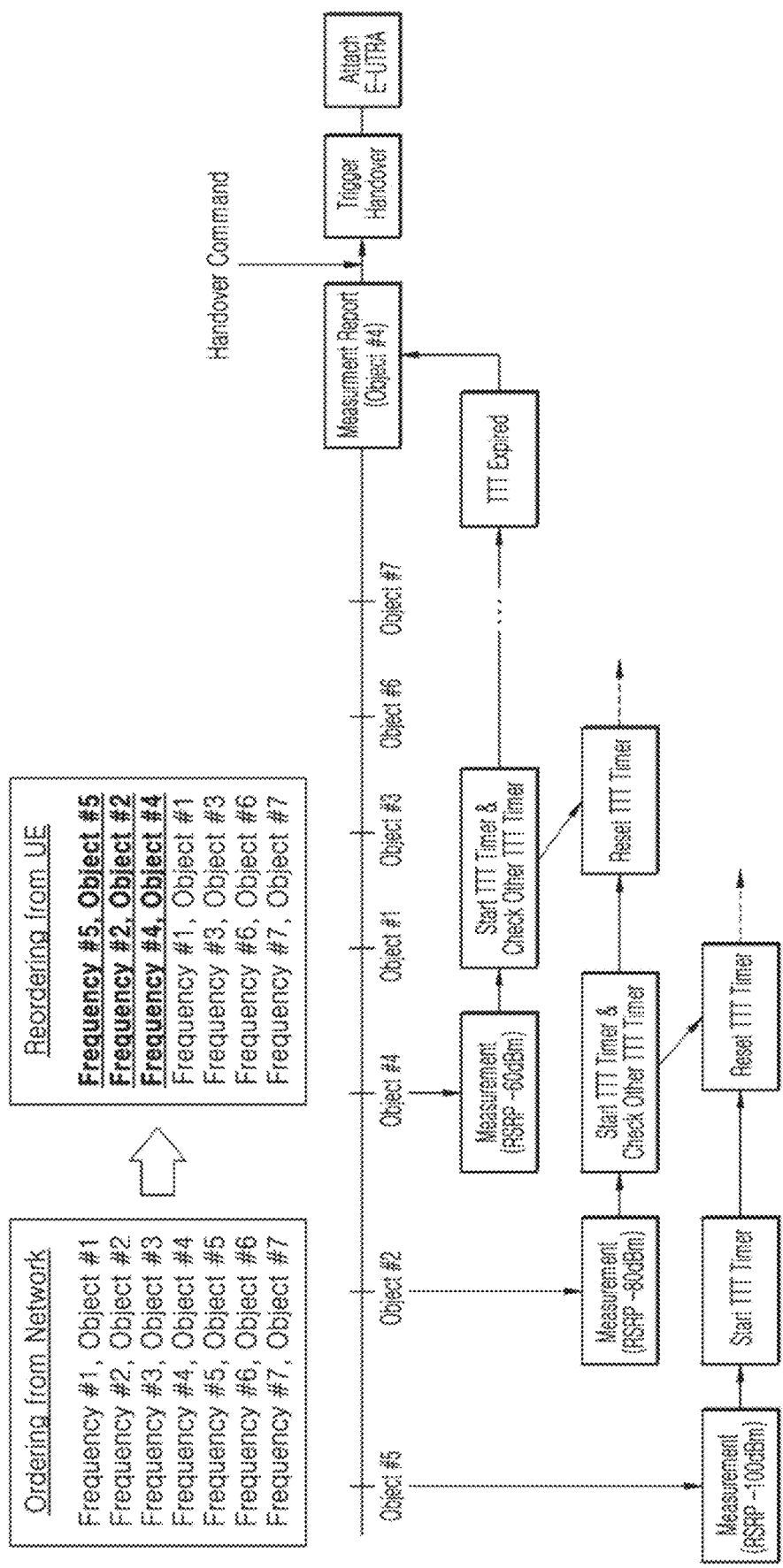
FIG. 8 illustrates an object measurement method for handover of a terminal, according to an example embodiment of the present disclosure.

FIG. 8 illustrates an object measurement method for handover of a terminal, according to an example embodiment of the present disclosure. A description to be made below is merely an example for helping understanding of an example embodiment of the present disclosure, and thus, an example embodiment is not limited thereto, and it is clear that an example embodiment of the present disclosure is applicable to various communication environments.

Referring to FIG. 8, the terminal may receive a list of ordered objects from a network through a source cell. The list may include first to seventh objects Object #1 to Object #7 listed in a certain measurement order and first to seventh frequency bands Frequency #1 to Frequency #7 making pairs with respective objects.

The terminal may reorder an object measurement order of the list based on handover information indicating a connection history of the terminal. The terminal may reorder the list so that a measurement operation is selectively performed in an order of the fifth object Object #5, the second object Object #2, and the fourth object Object #4. According to an example embodiment, the list of objects provided with the RRC reconfiguration message (may also be referred to as first objects) may be reordered based on priorities of corresponding objects (e.g., the same objects, or similar objects) indicated in the handover information (may also be referred to as second objects).

The terminal may selectively measure RSRP of a reference signal received through the fifth frequency band Frequency #5 corresponding to the fifth object Object #5 (hereinafter, referred to as RSRP of the fifth object Object #5) with reference to the reordered list. For example, the RSRP of the fifth object Object #5 may be measured as −100 dBm. The terminal may confirm that the RSRP of the fifth object Object #5 is greater than a threshold, and start a TTT timer corresponding to the fifth object Object #5.

The terminal may measure RSRP of a reference signal received through the second frequency band Frequency #2 corresponding to the second object Object #2 (hereinafter, referred to as RSRP of the second object Object #2) with reference to the reordered list. For example, the RSRP of the second object Object #2 may be measured as −80 dBm. The terminal may confirm that the RSRP of the second object Object #2 is greater than the threshold, and start a TTT timer corresponding to the second object Object #2. The terminal may compare the RSRP of the second object Object #2 to the RSRP of the fifth object Object #5, confirm that the RSRP of the second object Object #2 is greater than the RSRP of the fifth object Object #5, and reset the TTT timer corresponding to the fifth object Object #5 by checking the other TTT timer.

The terminal may measure RSRP of a reference signal received through the fourth frequency band Frequency #4 corresponding to the fourth object Object #4 (hereinafter, referred to as RSRP of the fourth object Object #4) with reference to the reordered list. For example, the RSRP of the fourth object Object #4 may be measured as −60 dBm. The terminal may confirm that the RSRP of the fourth object Object #4 is greater than the threshold, and start a TTT timer corresponding to the fourth object Object #4. The terminal may compare the RSRP of the fourth object Object #4 to the RSRP of the second object Object #2, confirm that the RSRP of the fourth object Object #4 is greater than the RSRP of the second object Object #2, and reset the TTT timer corresponding to the second object Object #2 by checking the other TTT timer.

Thereafter, although not shown, the terminal may sequentially perform a measurement operation on the first, third, sixth, and seventh objects Object #1, Object #3, Object #6, and Object #7.

The terminal may transmit a measurement report to the source cell based on a measurement result related to the RSRP of the fourth object Object #4 when it is confirmed that a TTT expires through the TTT timer corresponding to the fourth object Object #4. The terminal may start handover in response to a handover command received from the source cell and may be connected to Evolved Universal Terrestrial Radio Access (E-UTRA). However, E-UTRA is merely an example, and thus an example embodiment is not limited thereto, and the terminal may be connected to various networks such as Evolved Universal Mobile Telecommunications System (E-UMTS) and Evolved UMTS Terrestrial Radio Access Network (E-UTRAN).

The terminal may quickly measure an object having a relatively higher electric field strength through the operation described above and transmit a measurement report to the source cell, thereby enhancing a handover success probability and improving communication performance with a target cell in the future.

Figure 9:
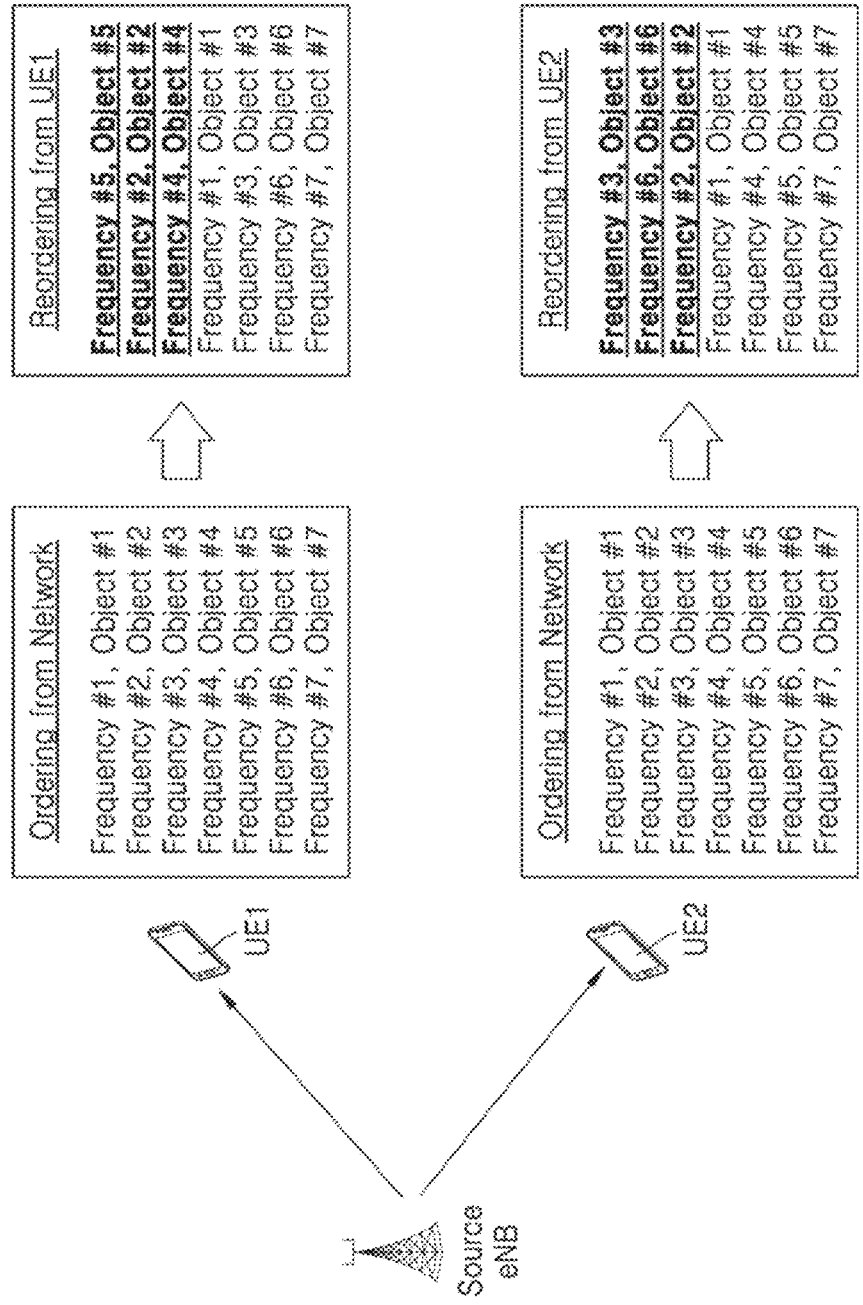
FIG. 9 illustrates an operation method of a communication system, according to an example embodiment of the present disclosure.

FIG. 9 illustrates an operation method of a communication system, according to an example embodiment of the present disclosure.

Referring to FIG. 9, the communication system may include a source cell Source eNB and the first and second terminals UE1 and UE2. The first and second terminals UE1 and UE2 may be in an RRC connected state with the same source cell Source eNB (or similar source cell Source eNBs) and may perform a measurement operation for handover. The first and second terminals UE1 and UE2 may receive the same list of objects, or similar lists of objects, from the source cell Source eNB. The first and second terminals UE1 and UE2 may each reorder a measurement order of the first to seventh objects Object #1 to Object #7 in their order to be suitable for respective connection histories of the first and second terminals UE1 and UE2.

For example, the first terminal UE1 may reorder an object measurement order to selectively perform a measurement operation in an order of the fifth object Object #5, the second object Object #2, and the fourth object Object #4. The second terminal UE2 may reorder the list to selectively perform a measurement operation in an order of the third object Object #3, the sixth object Object #6, and the second object Object #2.

As such, although the first and second terminals UE1 and UE2 are both in the RRC connected state with the source cell Source eNB, the first and second terminals UE1 and UE2 may customize the list of objects having the same measurement order (or similar measurement orders) so that the list is suitable for the respective connection histories of the first and second terminals UE1 and UE2. As a result, an object measurement order for handover may differ for the first and second terminals UE1 and UE2.

Figure 10:
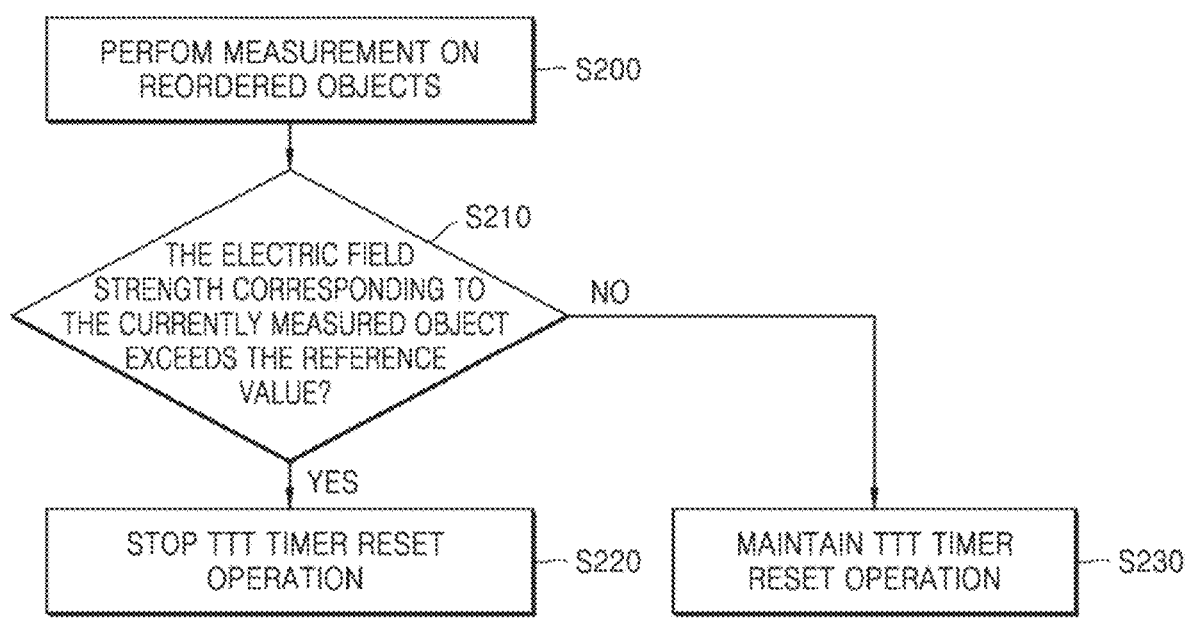
FIG. 10 is a flowchart of an operation method of a terminal, according to an example embodiment of the present disclosure.

FIG. 10 is a flowchart of an operation method of a terminal, according to an example embodiment of the present disclosure.

Referring to FIG. 10, in operation S200, the terminal may perform a measurement on reordered objects. In operation S210, the terminal may check whether an electric field strength of a currently measured object is greater than a reference value. When operation S210 indicates 'YES', the terminal may suspend a TTT timer reset operation in operation S220. Otherwise, when operation S210 indicates 'NO', the terminal may maintain the TTT timer reset operation in operation S230.

That is, when the electric field strength of the currently measured object is greater than the reference value, the terminal may determine that it is possible to transmit a measurement report to a source cell based on a measurement result of an object capable of guaranteeing or providing a sufficient electric field strength after completing handover, and suspend (or skip) resetting a TTT timer corresponding to the currently measured object according to an electric field strength of a subsequently measured object. As a result, the terminal may quickly transmit a measurement report to the source cell based on a measurement result of an object having an electric field strength that is greater than the reference value, thereby performing quick handover.

Figure 11:
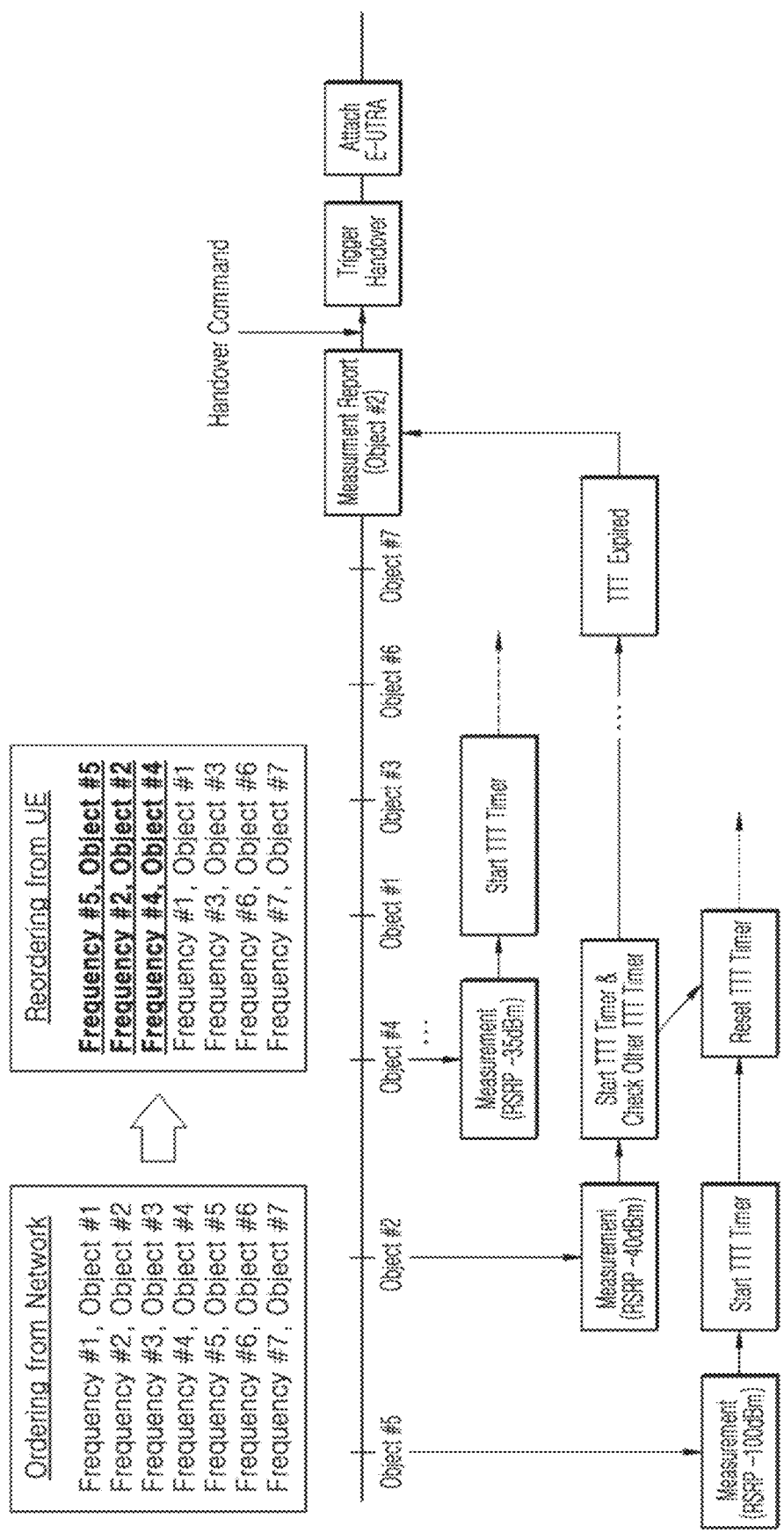
FIG. 11 illustrates an object measurement method for handover of a terminal, according to an example embodiment of the present disclosure.

FIG. 11 illustrates an object measurement method for handover of a terminal, according to an example embodiment of the present disclosure. Hereinafter, the description made with reference to FIG. 8 is not repeated herein.

Referring to FIG. 11, the terminal may measure RSRP of a reference signal received through the second frequency band Frequency #2 corresponding to the second object Object #2 (hereinafter, referred to as the RSRP of the second object Object #2) next to measurement of the fifth object Object #5 with reference to a reordered list. For example, the RSRP of the second object Object #2 may be measured as −40 dBm. The terminal may confirm that the RSRP of the second object Object #2 is greater than the threshold, and start a TTT timer corresponding to the second object Object #2. The terminal may compare the RSRP of the second object Object #2 to the RSRP of the fifth object Object #5, confirm that the RSRP of the second object Object #2 is greater than the RSRP of the fifth object Object #5, and reset the TTT timer corresponding to the fifth object Object #5 by checking the other TTT timer. According to an example embodiment, the terminal may reset the TTT timer corresponding to the fifth object Object #5 in response to determining that the RSRP of the second object Object #2 is greater than the RSRP of the fifth object Object #5.

In an example embodiment, the terminal may confirm that the RSRP of the second object Object #2 is greater than the reference value, and suspend a reset operation of a TTT timer corresponding to previously measured objects based on a measurement result of a subsequently measured object. That is, the terminal may control TTT timers so that the TTT timer corresponding to the second object Object #2 is not reset. In an example embodiment, the reference value may be set to be greater than the threshold. According to an example embodiment, the terminal may suspend (e.g., skip) the reset operation of the TTT timer corresponding to the second object Object #2 in response to determining that the RSRP of the second object Object #2 is greater than the reference value. According to an example embodiment, suspending the reset operation of the TTT timer corresponding to the second object Object #2 may include causing the TTT timer to run to expiry without resetting the TTT timer.

The terminal may measure RSRP of a reference signal received through the fourth frequency band Frequency #4 corresponding to the fourth object Object #4 (hereinafter, referred to as the RSRP of the fourth object Object #4) with reference to the reordered list. For example, the RSRP of the fourth object Object #4 may be measured as −35 dBm. The terminal may confirm that the RSRP of the fourth object Object #4 is greater than the threshold, and start a TTT timer corresponding to the fourth object Object #4. The terminal may skip resetting the TTT timer corresponding to the second object Object #2 although the RSRP of the fourth object Object #4 is greater than the RSRP of the second object Object #2.

Thereafter, although not shown, the terminal may sequentially perform a measurement operation on the first, third, sixth, and seventh objects Object #1, Object #3, Object #6, and Object #7.

The terminal may transmit a measurement report to the source cell based on a measurement result related to the RSRP of the second object Object #2 when it is confirmed that a TTT expires through the TTT timer corresponding to the second object Object #2. The terminal may start handover in response to a handover command received from the source cell and may be connected to E-UTRA. However, E-UTRA is merely an example, and thus an example embodiment is not limited thereto, and the terminal may be connected to various networks such as E-UMTS and E-UTRAN.

The terminal may quickly transmit a measurement report to the source cell based on a measurement result of a corresponding object when an object capable of ensuring or providing a sufficient electric field strength is objectively measured through the operation described above, thereby reducing a latency in handover.

Figure 12:
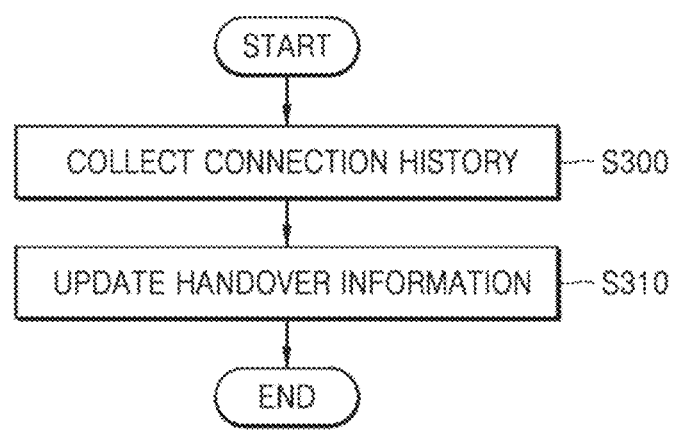
FIG. 12 is a flowchart of an operation method of a terminal, according to an example embodiment of the present disclosure.

FIG. 12 is a flowchart of an operation method of a terminal, according to an example embodiment of the present disclosure.

Referring to FIG. 12, in operation S300, the terminal may collect a connection history of the terminal. In operation S310, the terminal may periodically or aperiodically update handover information by using the collected connection history. The terminal may reorder a list of objects for handover by using the updated handover information.

Figure 13:
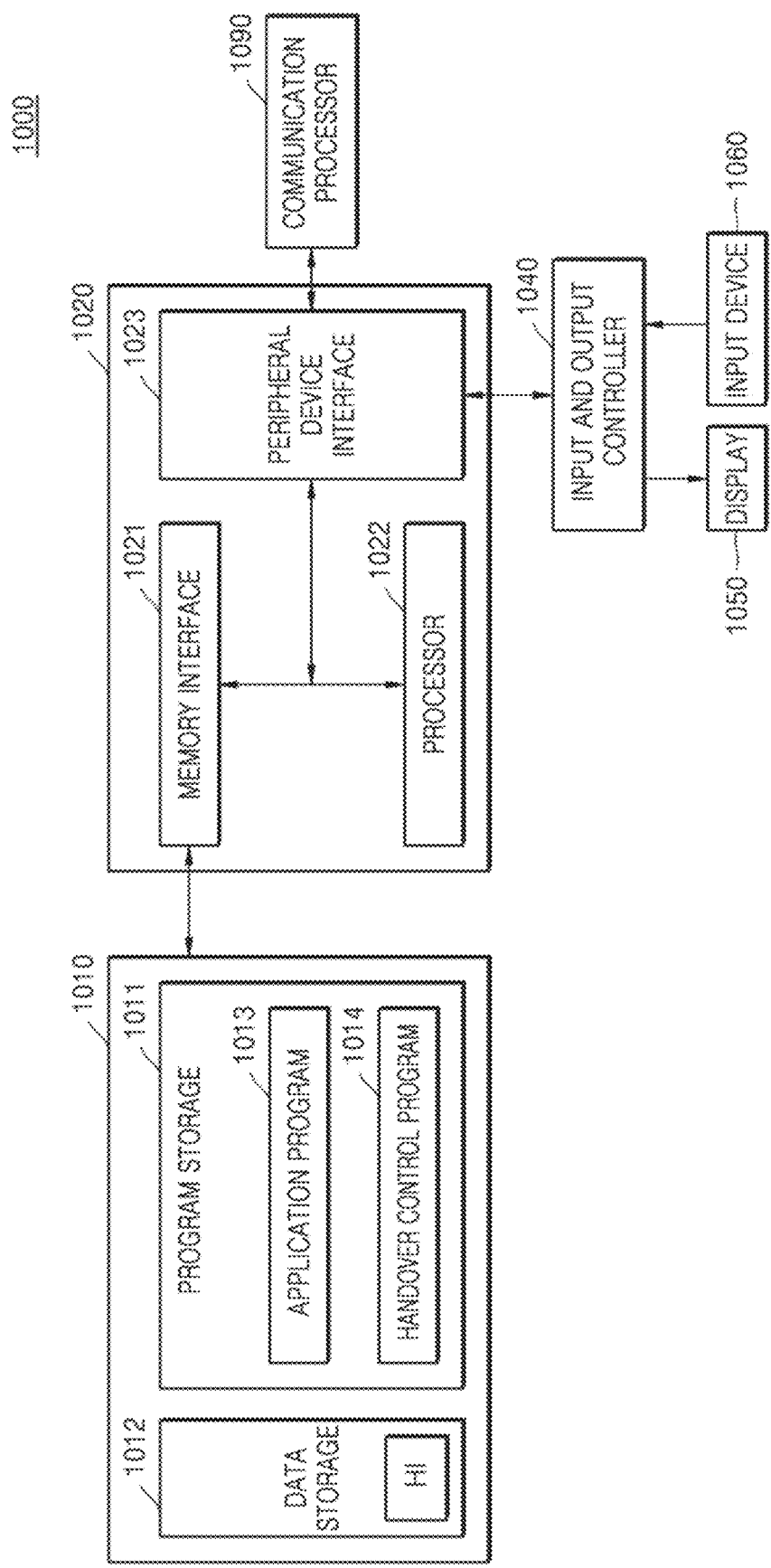
FIG. 13 is a block diagram of an electronic device according to an example embodiment of the present disclosure.

FIG. 13 is a block diagram of an electronic device 1000 according to an example embodiment of the present disclosure.

Referring to FIG. 13, the electronic device 1000 may include a memory 1010, a processor unit 1020, an input and output controller 1040, a display 1050, an input device 1060, and/or a communication processor 1090. Herein, there may be a plurality of memories 1010. Each component will be described as follows.

The memory 1010 may include a program storage 1011 storing programs for controlling an operation of the electronic device 1000, and/or a data storage 1012 storing data generated while the programs are being executed. The data storage 1012 may store data used for operations of an application program 1013 and/or a handover control program 1014. In an example embodiment, the data storage 1012 may store handover information HI for reordering, which indicates a connection history of the electronic device 1000, according to an example embodiment of the present disclosure. In addition, the handover information HI may be periodically or aperiodically updated.

The program storage 1011 may include the application program 1013 and/or the handover control program 1014. Herein, a program included in the program storage 1011 is a set of instructions and may be referred to as an instruction set. The application program 1013 may include program code for execution of various applications operating in the electronic device 1000. That is, the application program 1013 may include code (or commands) related to various applications driven (e.g., executed) by a processor 1022. The handover control program 1014 may include control code for performing a measurement operation for handover, according to an example embodiment of the present disclosure.

The processor unit 1020 may include the memory interface 1021, the processor 1022 and/or the peripheral device interface 1023. The memory interface 1021 may control a connection among the memory 1010, the processor 1022, and/or the peripheral device interface 1023.

In an example embodiment, the processor 1022 may execute the handover control program 1014 to reorder a measurement order of a list of objects so that the measurement order is suitable for the connection history of the electronic device 1000, and to perform an operation of controlling resetting of a TTT timer based on a measurement result of the objects.

The electronic device 1000 may include the communication processor 1090 configured to perform a communication function for voice communication and/or data communication. The processor 1022 may receive an RRC reconfiguration message from a source cell through the communication processor 1090, perform a measurement operation on objects in response to the received RRC reconfiguration message, and transmit, through the communication processor 1090, a measurement report to the source cell based on a measurement result of a certain object satisfying a certain condition.

The peripheral device interface 1023 may control a connection among the input and output controller 1040, the communication processor 1090, the processor 1022, and/or the memory interface 1021. The processor 1022 may use at least one software program to control a plurality of cells to provide a corresponding service. In this case, the processor 1022 may provide a service corresponding to a corresponding program by executing at least one program stored in the memory 1010.

The input and output controller 1040 may provide an interface between an input and output devices, such as the display 1050 and/or the input device 1060, and the peripheral device interface 1023. The display 1050 may display state information, an input character, a moving picture, a still picture, and/or the like. For example, the display 1050 may display information about an application program driven (e.g., executed) by the processor 1022.

The input device 1060 may provide input data generated by a selection of the electronic device 1000 to the processor unit 1020 through the input and output controller 1040. In this case, the input device 1060 may include a keypad including at least one hardware button, a touch pad configured to sense touch information, and/or the like. For example, the input device 1060 may provide, to the processor 1022 through the input and output controller 1040, touch information about a touch, a touch motion, a touch release, and/or the like sensed through the touch pad.

Figure 14:
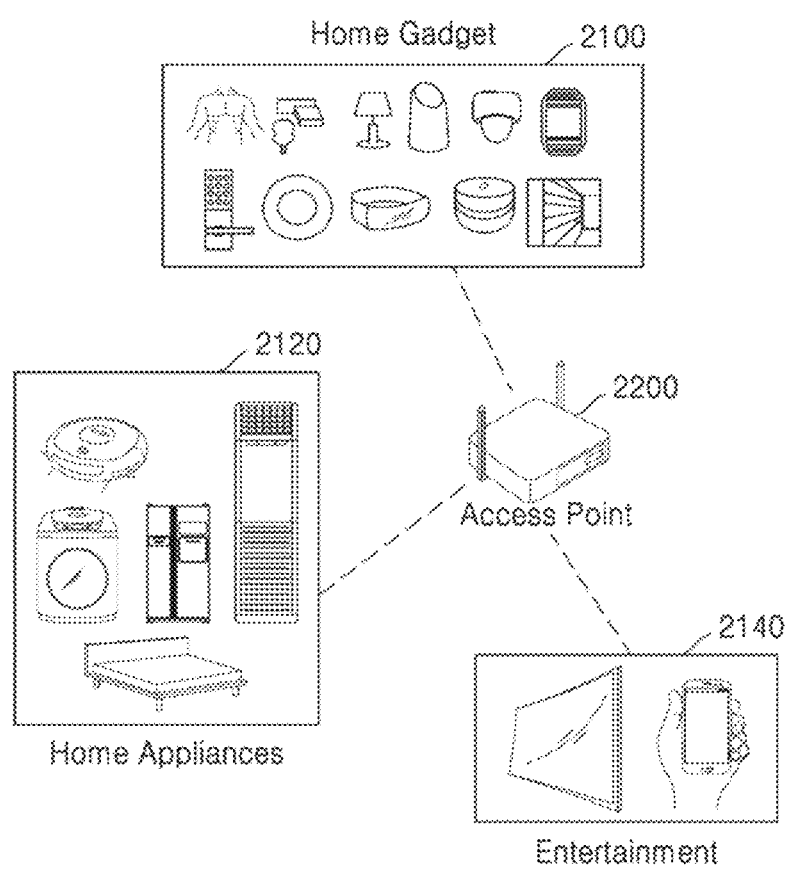
FIG. 14 illustrates communication devices for performing a handover operation, according to an example embodiment of the present disclosure.

FIG. 14 illustrates communication devices for performing a handover operation, according to an example embodiment of the present disclosure.

Referring to FIG. 14, home gadgets 2100, home appliances 2120, entertainment devices 2140, and/or an AP 2200 may perform a handover operation according to an example embodiment of the present disclosure. A plurality of APs 2200 may be respectively located at various points, and each of the home gadgets 2100, the home appliances 2120, and the entertainment devices 2140 may be handed over from any one of the plurality of APs 2200 to another AP 2200 based on a measurement operation according to an example embodiment of the present disclosure.

In an example embodiment, the home gadgets 2100, the home appliances 2120, the entertainment devices 2140, and/or the APs 2200 may construct an Internet of Things (IoT) network system. The communication devices shown in FIG. 14 are merely illustrative, and it will be understood that a wireless communication device according to an example embodiment of the present disclosure may also be included in other communication devices not shown in FIG. 14.

Conventional devices perform handover measurement operations according to a measurement order provided from a network without sufficient consideration of the reliability of the electric field states detected in these measurement operations. Accordingly, an excessively high proportion of handovers fail due to insufficient electric field strength resulting in excessive resource consumption (e.g., processor, memory, power, bandwidth, delay, etc.) and/or inefficiency during handover operations.

However, according to an example embodiment, improved devices and methods are provided for performing handover measurement operations. For example, the improved devices and methods may modify the measurement order provided from the network according to electric field strengths previously measured by the terminal and/or a timing thereof, thereby increasing the probability of a successful handover. Accordingly, the improved devices and methods overcome the deficiencies of the conventional devices to reduce resource consumption (e.g., processor, memory, power, bandwidth, delay, etc.) and/or improve efficiency during handover operations.

According to an example embodiment, operations described herein as being performed by the terminal 100, the RFIC 110, the baseband IC 120, the processor 130, the handover control circuit 132, the source cell 10, the target cell 20, the source cell Source eNB, the first terminal UE1, the second terminal UE2, the electronic device 1000, the processor unit 1020, the input and output controller 1040, the communication processor 1090, the application program 1013, the handover control program 1014, the memory interface 1021, the processor 1022, the peripheral device interface 1023, the home gadgets 2100, the home appliances 2120, the entertainment devices 2140, and/or the AP 2200 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to an example embodiment thereof, it will be understood that various changes in form and details may be made therein without departing from the spirit and scope of the following claims.

What is claimed is:

1. A method of operating a terminal, the method comprising:
    receiving, from a source cell, a radio resource control (RRC) reconfiguration message including a list of a plurality of first objects in a measurement order;
    reordering the list of the plurality of first objects based on handover information to obtain a reordered list, the handover information corresponding to a connection history of the terminal;
    sequentially measuring the plurality of first objects based on the reordered list to obtain a measurement result; and
    transmitting a measurement report to the source cell based on the measurement result, wherein
        the handover information includes first priorities of a plurality of second objects corresponding to a plurality of cells to which the terminal was previously connected within a period of time,
        the first priorities of the plurality of second objects are determined such that a second object corresponding to a cell among the plurality of cells to which the terminal connected more recently is assigned a higher priority, and
        the handover information includes second priorities of the plurality of second objects, the second priorities of the plurality of second objects are determined such that a second object corresponding to a cell among the plurality of cells of which a higher electric field strength has been measured by the terminal is assigned a higher priority.

2. The method of claim 1, wherein the reordering the list of the plurality of first objects comprises reordering the list of the plurality of first objects based on the first priorities of one or more of the plurality of second objects corresponding to one or more of the plurality of first objects.

3. The method of claim 1, wherein the handover information includes network coverage-specific priorities of the plurality of second objects.

4. The method of claim 1, wherein the sequentially measuring the plurality of first objects comprises:
    measuring a plurality of electric field strengths of a plurality of frequency bands respectively corresponding to the plurality of first objects in an order based on the reordered list;
    comparing the electric field strengths to obtain a comparison result; and
    controlling a time to trigger (TTT) timer based on the comparison result.

5. The method of claim 4, wherein
    the plurality of electric field strengths includes a first electric field strength and a second electric field strength, and the plurality of first objects includes a currently measured object and a previously measured object; and
    the controlling the TTT timer comprises resetting the TTT timer in response to determining the first electric field strength corresponding to the currently measured object is greater than the second electric field strength corresponding to the previously measured object, the TTT timer corresponding to the previously measured object.

6. The method of claim 1, wherein the measurement result corresponds to one of the plurality of first objects, the one of the plurality of first objects corresponding to an expired TTT timer.

7. The method of claim 1, further comprising:
    collecting the connection history of the terminal; and
    updating the handover information based on the collected connection history.

8. The method of claim 1, wherein the sequentially measuring comprises:
    measuring a first electric field strength of a first measured object among the plurality of first objects;
    measuring at least one second electric field strength of at least one second measured object among the plurality of first objects, the at least one second measured object being ordered after the first measured object on the reordered list, and the at least one second electric field strength being measured within a time period after the measuring the first electric field strength; and
    determining the measurement result to correspond to the first electric field strength based on,
        the first electric field strength being greater than a first threshold, and
        the first electric field strength being greater than the at least one second electric field strength.

9. The method of claim 1, wherein the sequentially measuring comprises:
    measuring a first electric field strength of a first measured object among the plurality of first objects;
    measuring at least one second electric field strength of at least one second measured object among the plurality of first objects, the at least one second measured object being ordered after the first measured object on the reordered list, and the at least one second electric field strength being greater than the first electric field strength; and
    determining the measurement result to correspond to the first electric field strength based on the first electric field strength exceeding a reference value.

10. The method of claim 1, wherein each of the plurality of first objects corresponds to:
    a respective cell; and
    a respective frequency of the respective cell.

11. A terminal comprising:
    a memory storing handover information indicating a connection history; and
    processing circuitry configured to,
        reorder a list of a plurality of first objects based on the connection history to obtain a reordered list in response to a radio resource control (RRC) reconfiguration message from a source cell, the RRC reconfiguration message including the list of the plurality of first objects in a measurement order,
        measure a plurality of electric field strengths corresponding to the plurality of first objects in order of the first objects in the reordered list to obtain a measurement result, and transmit a measurement report to the source cell based on the measurement result, wherein the plurality of electric field strengths include a currently measured electric field strength and a previously measured electric field strength, and the processing circuitry is configured to control resetting of a time to trigger (TTT) timer before the TTT timer expires in response to determining that the currently measure electric field strength is higher that the previously measure electric field strength, the TTT timer corresponding to the previously measure electric field strength.

12. The terminal of claim 11, wherein the handover information includes priorities of a plurality of second objects corresponding to a plurality of cells to which the terminal was previously connected within a period of time.

13. The terminal of claim 12, wherein the processing circuitry is configured to reorder the list of the plurality of first objects based on the priorities of one or more of the plurality of second objects corresponding to one or more of the plurality of first objects.

14. The terminal of claim 11, wherein the processing circuitry is configured to control resetting of the TTT timer to suspend the resetting of the TTT timer in response to determining the previously measured electric field strength is greater than a reference value.

15. The terminal of claim 11, wherein the processing circuitry is configured to measure the plurality of electric field strengths including:

measuring a first electric field strength of a first measured object among the plurality of first objects;

measuring at least one second electric field strength of at least one second measured object among the plurality of first objects, the at least one second measured object being ordered after the first measured object on the reordered list, and the at least one second electric field strength being measured within a time period after the measuring the first electric field strength; and determining the measurement result to correspond to the first electric field strength based on, the first electric field strength being greater than a first threshold, and the first electric field strength being greater than the at least one second electric field strength.

16. A communication system comprising:

a source cell configured to transmit, to a first terminal, a radio resource control (RRC) reconfiguration message including a list of a plurality of first objects in a measurement order; and the first terminal configured to, reorder the list of the plurality of first objects based on first handover information to obtain a first reordered list, the first handover information indicating a connection history of the first terminal, and measure a plurality of electric field strengths of a plurality of second objects among the plurality of first objects based on the first reordered list, and wherein the first terminal is configured to:

start a plurality of time to trigger (TTT) timers corresponding to a plurality of third objects among the plurality of first objects, the plurality of third objects corresponding to respective electric field strengths among the plurality of electric field strengths greater than a threshold, the plurality of TTT timers being started in an order in which the respective electric field strengths are measured, compare the respective electric field strengths of the plurality of third objects to obtain a comparison result, and reset one or more of the plurality of TTT timers based on the comparison result.

17. The communication system of claim 16, further comprising a second terminal connected to the source cell, the second terminal being configured to, reorder the list of the plurality of first objects based on second handover information to obtain a second reordered list, the second handover information indicating a connection history of the second terminal, and measure a plurality of electric field strengths of a plurality of fourth objects among the plurality of first objects based on the second reordered list.

18. The communication system of claim 17, wherein at least one of the plurality of second objects is different from at least one of the plurality of fourth objects.

* * * * *